United States Patent [19]

Takagi et al.

[11] Patent Number: 4,985,653
[45] Date of Patent: Jan. 15, 1991

[54] INTERNAL PRESSURE EXPLOSION-PROOF CONSTRUCTION FOR ELECTRICALLY-DRIVEN ROBOT

[75] Inventors: Noboru Takagi; Mitsuyoshi Obata, both of Kobe, Japan

[73] Assignee: Kabushiki Kaisha Kobe Seiko Sho, Kobe, Japan

[21] Appl. No.: 382,188

[22] Filed: Jul. 20, 1989

[51] Int. Cl.$^5$ .............................. H02K 9/28; B25J 3/00
[52] U.S. Cl. ...................................... 310/88; 137/883; 414/4; 901/23
[58] Field of Search .................... 137/883; 310/57, 71, 310/88, 89, 112; 318/481; 414/4; 901/23, 24, 49; 236/61; 237/73

[56] References Cited

U.S. PATENT DOCUMENTS

| | | | |
|---|---|---|---|
| 1,875,246 | 8/1932 | Lifland | 237/73 |
| 4,495,968 | 1/1985 | Kist | 137/883 |
| 4,668,146 | 5/1987 | Ageta | 310/66 |
| 4,698,568 | 10/1987 | Nishizawa et al. | 901/49 |
| 4,732,526 | 3/1988 | Nakashima et al. | 310/88 |

FOREIGN PATENT DOCUMENTS

| | | | |
|---|---|---|---|
| 57-3547 | 1/1982 | Japan | 310/88 |
| 57-3555 | 1/1982 | Japan | 310/88 |

*Primary Examiner*—Steven L. Stephan
*Assistant Examiner*—D. L. Rebsch
*Attorney, Agent, or Firm*—Oblon, Spivak, McClelland, Maier & Neustadt

[57] ABSTRACT

An internal pressure explosion-proof construction for an electrically-driven robot with which purging of airtight chambers of the robot in which electric motors are installed can be performed efficiently in a short time when air or inert gas is charged into the airtight chambers. The airtight chambers in which the electric motors are divided into a plurality of blocks, and an automatic opening and closing valve is provided at an outlet port connected to each of the blocks such that it may be opened only when the corresponding block is to be purged.

6 Claims, 3 Drawing Sheets

4,985,653

INTERNAL PRESSURE EXPLOSION-PROOF CONSTRUCTION FOR ELECTRICALLY-DRIVEN ROBOT

BACKGROUND OF THE INVENTION

1. Field of the Invention

This invention relates to an internal pressure explosion-proof construction for an electrically-driven robot which is used in an atmosphere in which there is a danger of exploding such as, for example, a robot for coating operation.

2. Description of the Prior Art

An internal pressure explosion-proof construction for an electrically-driven robot (hereinafter referred to simply as robot) is already known and disclosed, for example, in Japanese Utility Model Publication No. 59-160193 and Japanese Patent Laid-Open No. 61-14889 which corresponds to U.S. Pat. No. 4,732,526.

According to such conventional internal pressure explosion-proof constructions, an electric motor for driving an arm is installed in an airtight chamber formed in each of the arm of the robot, and the individual airtight chambers are connected with each other by means of a hose of the sealing type in which wires or conductors are accommodated.

Prior to operation of the robot, air or inert gas of a pressure higher than the atmospheric pressure is supplied into each of the airtight chambers by way of the hose in order to purge the airtight chambers of any explosive gas which may possibly be contained therein. In this manner, explosive gas around the robot is prevented from entering the airtight chambers.

With such an internal pressure explosion-proof construction as described above, however, since all of the airtight chambers in which the motors are installed are connected with each other by the hoses and/or air pipes, they make a single large airtight chamber as a whole. Accordingly, the airtight chambers in which explosive gas is contained cannot be purged efficiently, and it takes long time to purge. Further, the fact that no air discharging opening is provided individually for each of the airtight chambers contributes to the necessary a long time to purge.

SUMMARY OF THE INVENTION

It is an object of the present invention to provide an internal pressure explosion-proof construction for an electrically-driven robot with which purging of airtight chambers of the robot in which electric motors are installed can be performed efficiently in a short time when air or inert gas is charged into the airtight chambers.

In order to attain the object, according to a feature of the present invention, an internal pressure explosion-proof system, for an electrically-driven robot of the type wherein an electric driving motor is installed in each of a plurality of airtight chambers into which air or inert gas is charged when the electrically-driven robot is to be rendered operative, is constructed such that the airtight chambers are divided into a plurality of blocks, and an automatic opening and closing valve is provided at an outlet port of each block such that it may be opened only when the corresponding block is to be purged.

With the internal pressure explosion-proof construction, when air or inert gas is to be charged into the airtight chambers in which the motors are installed, purging of the airtight chambers can be performed efficiently in a short time.

According to another feature of the invention, the above object is accomplished by an electrically driven robot having a plurality of electrical motors and an internal pressure explosion proof construction. The internal pressure explosion proof construction comprises an airtight chamber enclosing each of the motors, a gas manifold connected to a source of a pressurized gas, first means for connecting at least two of the airtight chambers directly to the manifold for supplying a gas to the at least two airtight chambers, second means for selectively connecting at least two of the airtight chambers to the atmosphere, and third means for connecting at least one of the at least two airtight chambers directly connected to the manifold and the at least two airtight chambers selectively connected to the atmosphere with at least one other airtight chamber for supplying a gas from the manifold to the at least one other airtight chamber. As a result, the airtight chambers connected to the at least one other airtight chamber, together with the at least one other airtight chamber itself, form blocks which can be separately supplied with gas from the manifold and separately communication with the atmosphere.

The above and other objects, features and advantages of the present invention will become apparent from the following description and the appended claims, taken in conjunction with the accompanying drawings.

DETAILED DESCRIPTION OF THE PREFERRED EMBODIMENT

Figure 1:
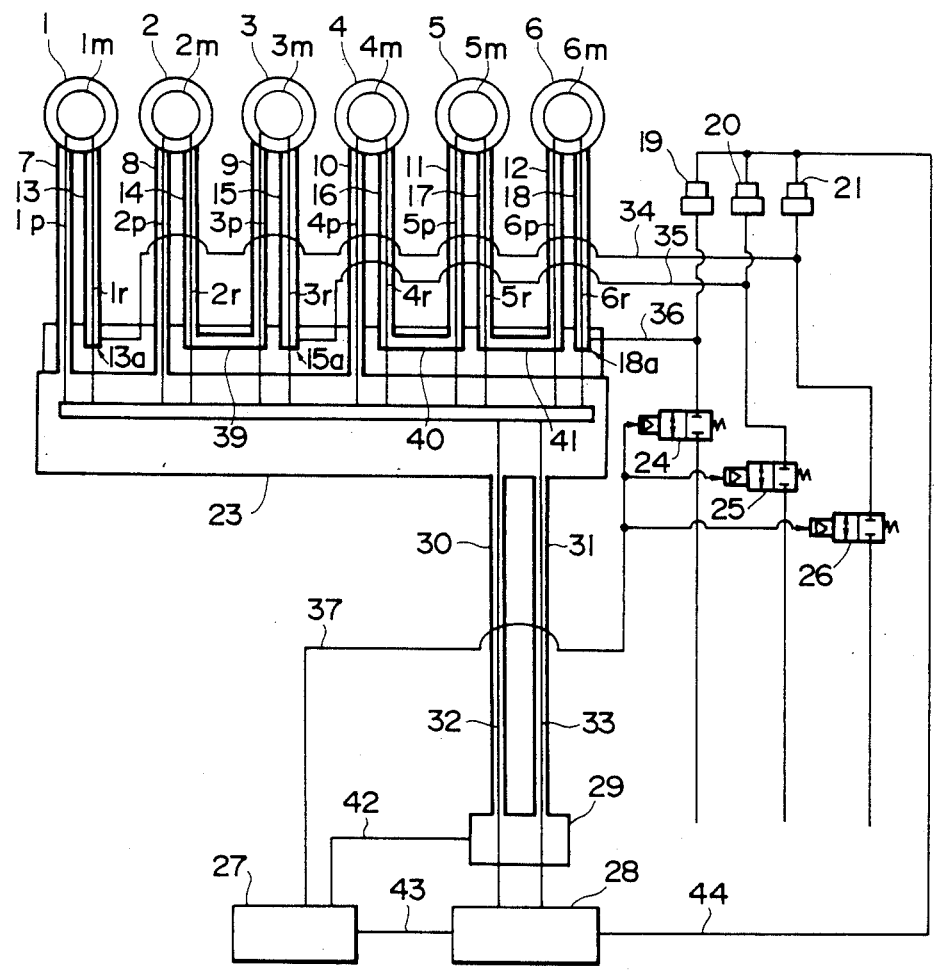
FIG. 1 is a diagrammatic representation of an internal pressure explosion-proof construction for an electrically-driven robot showing a preferred embodiment of the present invention.

Referring first to FIG. 1, there is shown in diagrammatic representation of an internal pressure explosion-proof construction for an electrically-driven robot. The robot here is of the 6-axis type and includes up to 6 electric motors $1m$, $2m$, $3m$, $4m$, $5m$ and $6m$ individually provided for driving six arms (not shown) of the robot. The motors $1m$ to $6m$ are installed in airtight chambers 1, 2, 3, 4, 5 and 6, respectively, provided in the individual arm sections of the robot. Before the robot is rendered operative, air or inert gas of a pressure higher than the atmospheric pressure is supplied into the airtight chambers 1 to 6 to prevent admission of explosive gas around the robot into the airtight chambers 1 to 6.

The airtight chamber 1 is connected by way of an air supply hose 7 to a terminal box 23 which acts as a gas mode has a gas distributing function. An air discharging hose 13 is connected to the airtight chamber 1, and an air discharging opening $13a$ thereof is connected to an air discharging automatic opening and closing valve 26 by way of a pipe 34 to which a pressure detector 21 is attached.

The airtight chambers 2 and 3 are connected with each other by way of an air discharging hose 14, a connecting bore 39 formed in the terminal box 23 and an air supply hose 9, and the airtight chamber 2 is connected to the terminal box 23 by way of another air supply hose 8. An air discharging hose 15 is connected to the airtight chamber 3, and an air discharging opening 15a thereof is connected to an automatic opening and closing valve 25 by way of a pipe 35 to which a pressure detector 20 is attached.

The airtight chambers 4 and 5 are connected with each other by way of an air discharging hose 16, a connecting bore 40 formed in the terminal box 23 and an air supply hose 11 while the airtight chambers 5 and 6 are connected with each other by way of another air discharging hose 17, another connecting bore 41 formed in the terminal box 23 and another air supply hose 12. The airtight chamber 4 is connected to the terminal box 23 by way of an air supply hose 10. An air discharging hose 18 is connected to the airtight chamber 6, and an air discharging opening 18a thereof is connected to an automatic opening and closing valve 24 by way of a pipe 36 to which a pressure detector 19 is attached.

As described above, in the internal pressure explosion-proof construction according to the present embodiment, the airtight chambers 1 to 6 are divided into three blocks including a first block consisting of the airtight chamber 1, a second block consisting of the airtight chambers 2 and 3, and a third block consisting of the airtight chambers 4, 5 and 6.

The air supply hoses 7, 8 and 10 comprise first connecting means. The air discharging hoses 13, 15 and 18 comprise second connecting means. The remaining hose comprise third connecting means.

The terminal box 23 is connected to a air connecting box 29 by way of a pair of air supply hoses 30 and 31. The air connecting box 29 is connected to an air supply device 27 by way of a pipe 42.

The air supply device 27 provides a pilot pressure to the automatic opening and closing valves 24, 25 and 26 by way of a pipe 37.

Before the robot is energized, the air supply device 27 supplies compressed air or compressed inert gas into the pipe 42. In this instance, the automatic opening and closing valves 24 to 26 remain in a closed position. If all of the internal pressure values of the airtight chambers 1 to 6 are higher than a preset pressure value for purging, then a signal is transmitted from a corresponding one of the pressure detectors 19 to 21 to a control panel (control means) 28 by way of a cable 44. Upon reception of the signal, the control panel 28 transmits a purging starting signal to the air supply device 27 by way of a cable 43 and starts a counting operation of a period of time for purging.

When such purging starting signal is received, the air supply device 27 supplies a pilot pressure to the automatic opening and closing valves 24 to 26 by way of the pipe 37 to open the valves 24 to 26. Purging is started from this time. After a predetermined period of time is counted by the control panel 28, the control panel 28 transmits a purging stopping signal to the air supply device 27 by way of the cable 43. When the purging stopping signal is received, the air supply device 27 stops supply of compressed air or inert gas to the automatic opening and closing valves 24 to 26 to close the valves 24 to 26.

If one of the pressure detectors 19 to 21 detects that a pressure is lowered by some trouble during such purging operation, then it immediately transmits a signal to the control panel 28 by way of the cable 44. Upon reception of the signal, the control panel 28 transmits a purging interrupting signal to the air supply device 27 by way of the cable 43. The air supply device 27 stops supply of compressed air or inert gas to the automatic opening and closing valves 24 to 26 to close the valves 24 to 26 immediately, thereby interrupting the purging operation.

After completion of a normal purging operation, operation of the robot is enabled.

Each of the pressure detectors 19 to 21 not only transmits a signal to the control panel 28 when the pressure within a corresponding airtight chamber decreases lower than the predetermined value whether a purging operation is being performed or the robot is operating but also transmits a signal indicating whether or not the preset pressure value is reached in a purging operation.

Meanwhile, air pilot valves are adopted for the automatic opening and closing valves 24 to 26 so that there may be no trouble even if they are disposed in a hazardous area.

Power line 32 and signal lines 33 are connected to the control panel 28 provided for controlling driving of the motors 1m to 6m and are contained in the air supply hoses 30 and 31, respectively, and individually connected to the terminal box 23. The power line 32 is branched into six power lines 1p, 2p, 3p, 4p, 5p and 6p in the terminal box 23. The branched power lines 1p to 6p extend through the air supply hoses 7, 8, 9, 10, 11 and 12 and are connected to the motors 1m, 2m, 3m, 4m, 5m and 6m, respectively. Also the signal line 33 is divided into six control signal lines 1r, 2r, 3r, 4r, 5r and 6r in the terminal box 23, and the branched signal lines 1r to 6r extend through the air supply hoses 13, 14, 15, 16, 17 and 18 and are connected to the motors 1m, 2m, 3m, 4m, 5m and 6m, respectively, similarly as in the case of the power line 32.

Figure 2A:
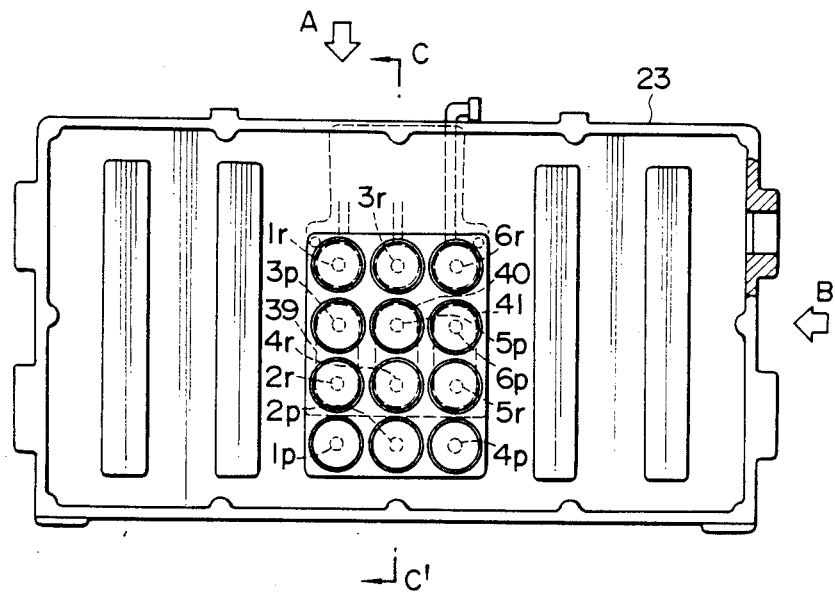
FIG. 2(a) is a front elevational view of a gas distributing terminal box which can be employed for the internal pressure explosion-proof construction shown in FIG. 1.
Figure 2B:
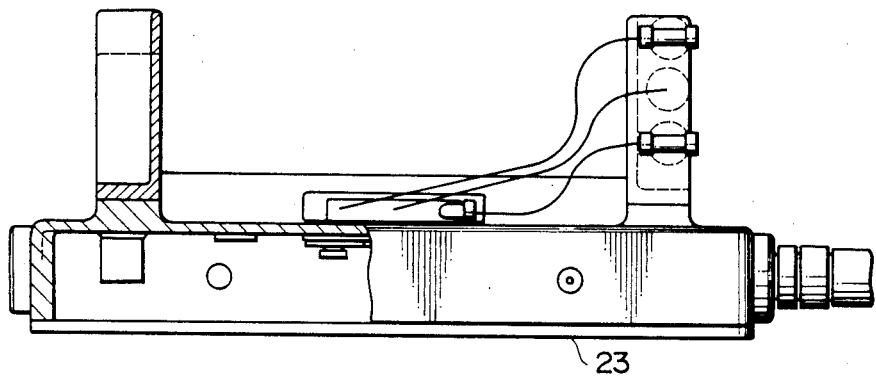
FIG. 2(b) is a side elevational view, partly in section, as viewed in the direction of an arrow mark A in FIG. 2(a)
Figure 2C:
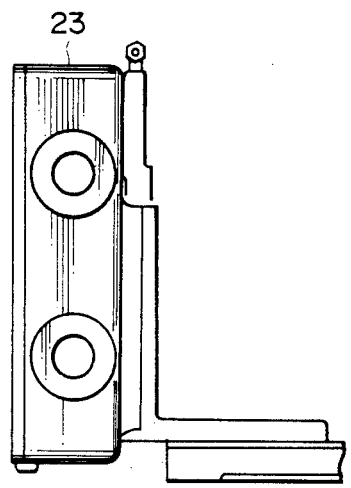
FIG. 2(c) is a side elevational view as viewed in the direction of an arrow mark B in FIG. 2(a)

Such an arrangement of the power lines 1p to 6p and signal lines 1r to 6r and the communicating bores 39 to 41 with respect to the terminal box 23 as described above can be seen particularly from FIG. 2(a).

Figure 2D:
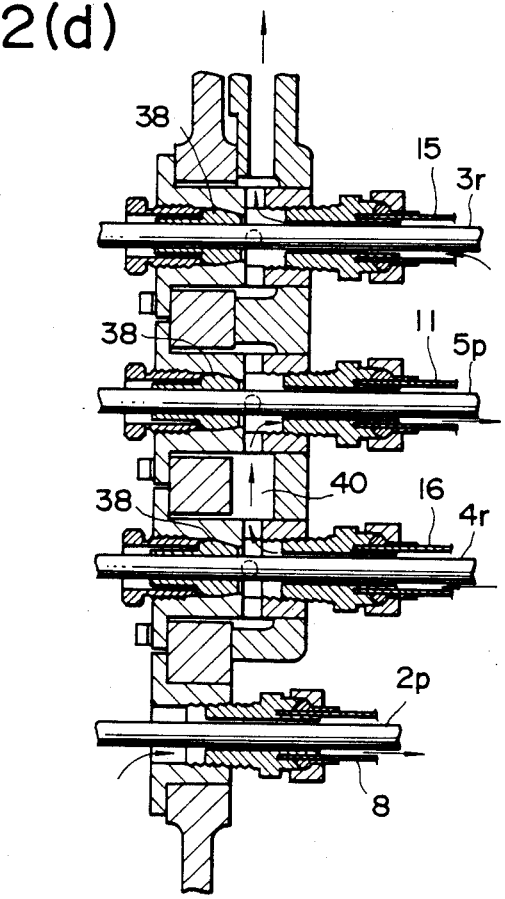
FIG. 2(d) is an enlarged sectional view taken along line C—C' of FIG. 2(a).

It is to be noted that, as shown in FIG. 2(d), portions of the power lines 1p to 6p and signal lines 1r to 6r which are inserted in the air supply hoses 7 to 12 and air discharging hoses 13 to 18, respectively, are sealed completely by rubber bushes 38 except for the air supply hoses 7, 8 and 10 connecting with the terminal box 23.

With the internal pressure explosion-proof construction according to the preferred embodiment of the present invention having such a construction as described above, when the robot is to be rendered operative, the automatic opening and closing valves 24, 25 and 26 are opened by air or inert gas supplied from the air supply device 27 so that the first block consisting of the airtight chamber 1, the second block consisting of the airtight chambers 2 and 3 and the third block consisting of the airtight chambers 4, 5 and 6 are purged at one time. Then, after completion of the purging operation of the airtight chambers 1 to 6, the automatic opening and closing valves 24, 25 and 26 are closed, and after that, air or inert gas having a pressure higher than the atmospheric pressure is charged into the airtight chambers 1 to 6.

In short, with the internal pressure explosion-proof construction of the embodiment described above, a purging operation of the airtight chambers 1 to 6 can be performed efficiently in a short time for the individual blocks.

Further, since in the embodiment described above connection of the power lines $1p$ to $6p$ and signal lines $1r$ to $6r$ to the respective motors $1m$ to $6m$ is established independently of each other by way of the air supply hoses 7 to 12 or air discharging hoses 13 to 18 which are connected to the airtight chambers 1 to 6, respectively, no noise will be picked up by the signal lines $1r$ to $6r$, and accordingly, the robot can be controlled with a high degree of accuracy.

Having now fully described the invention, it will be apparent to one of ordinary skill in the art that many changes and modifications can be made thereto without departing from the spirit and scope of the invention as set forth herein.

What is claimed is:

1. In an internal pressure explosion-proof construction for an electrically-driven robot of the type wherein an electric driving motor is installed in each of a plurality of airtight chambers into which air or inert gas is charged when said electrically-driven robot is to be rendered operative, the improvement comprising said airtight chambers being grouped into a plurality of blocks, an automatic opening and closing valve installed at an outlet port connected to each of said blocks, and pressure responsive means for opening said outlet port only when the corresponding block is to be purged.

2. In an electrically driven robot having a plurality of electrical motors, an internal pressure explosion proof construction comprising:
   an airtight chamber enclosing each of said motors;
   a gas manifold connected to a source of a pressurized gas;
   first means for connecting at least two of said airtight chambers directly to said manifold for supplying a gas to said at least two airtight chambers;
   second means for selectively connecting at least two of said airtight chambers to the atmosphere; and
   third means for connecting at least one of said at least two airtight chambers directly connected to said manifold and said at least two airtight chambers selectively connected to the atmosphere with at least one other airtight chamber for supplying a gas from said manifold to said at least one other airtight chamber, whereby said airtight chambers connected to said at least one other airtight chamber, and said at least one other airtight chamber, form blocks which can be separately supplied with gas from said manifold and separately connected with the atmosphere.

3. The electrically driven robot of claim 2 wherein each of said first, second and third means for connecting comprises a hose connected between said manifold and one of said airtight chambers.

4. The electrically driven robot of claim 3 wherein said manifold comprises a terminal box having electrical control signal lines and electrical power lines for each of said motors, wherein each of said power lines and control signal lines connects to one of said motors via a different one of said first, second and third connecting means.

5. The electrically driven robot of claim 3 wherein each second connecting means further comprises a pipe connecting said hose to the atmosphere and an automatic opening and closing valve in said pipe.

6. The electrically driven robot of claim 5 including control means for operating each said valve, comprising:
   a pressure sensor in said pipe; and
   means for operating each said valve in response to the sensed pressure in its respective pipe.

* * * * *